United States Patent [19]

Victory

[11] 3,858,691
[45] *Jan. 7, 1975

[54] BRAKE BAND END CONNECTION
[76] Inventor: Thomas J. Victory, 25167 Harcourt, Farmington, Mich. 48024
[ * ] Notice: The portion of the term of this patent subsequent to July 24, 1990, has been disclaimed.
[22] Filed: June 11, 1973
[21] Appl. No.: 369,073

Related U.S. Application Data
[63] Continuation-in-part of Ser. No. 269,534, July 7, 1972, Pat. No. 3,747,713.

[52] U.S. Cl. ............... 188/259, 29/427, 192/107 T
[51] Int. Cl. ........................................ F16d 65/06
[58] Field of Search ................ 188/249, 259, 77 R; 192/107 T; 29/427

[56] References Cited
UNITED STATES PATENTS

| | | | |
|---|---|---|---|
| 1,488,718 | 4/1924 | Sweet | 188/249 |
| 1,590,104 | 6/1926 | Manning | 188/249 |
| 2,692,663 | 10/1954 | Reed et al | 188/259 |
| 3,399,749 | 9/1968 | Baule | 188/259 |
| 3,732,954 | 5/1973 | Heid | 188/259 |
| 3,747,713 | 7/1973 | Victory | 188/259 |

Primary Examiner—Trygve M. Blix
Assistant Examiner—Edward R. Kazenske
Attorney, Agent, or Firm—Harness, Dickey & Pierce

[57] ABSTRACT

An end connection for a transmission brake band enabling the band to be inserted longitudinally into the space between the drum and housing. The end connection comprises an end plate welded to the band strap and having a reversely bent pocket. After inserting the band, a bracket is placed over the end plate with one end inserted in the pocket and the other reversely bent to engage end plate edge. The bracket has a tang engageable by the piston rod and is held in position by the housing so that the load is equally distributed between both ends of the end plate. In a modification, the reversely bent end of the bracket is relieved so that it does not engage the end plate but still serves to occupy the space between the band strap and the housing.

4 Claims, 5 Drawing Figures

3,858,691

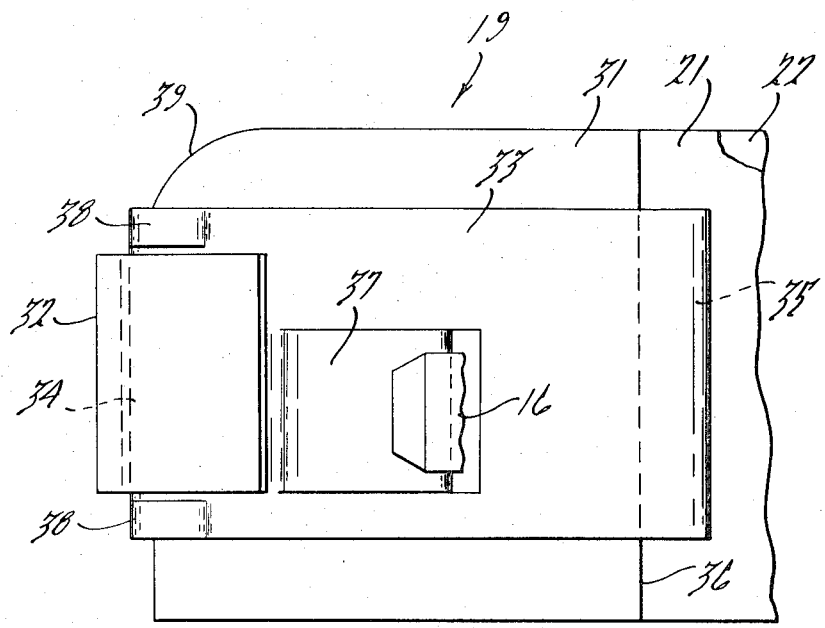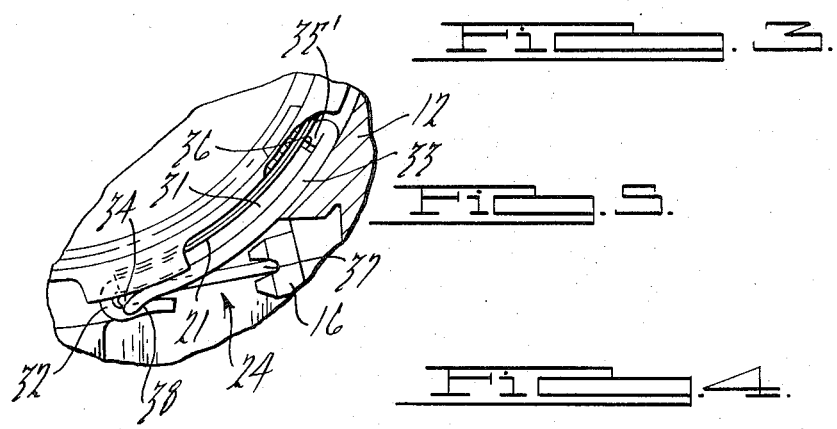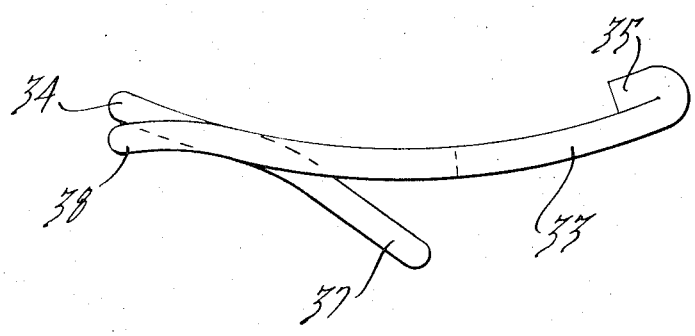

BRAKE BAND END CONNECTION

This application is a continuation-in-part of application Ser. No. 269,534, filed July 7, 1972 now U.S. Pat. No. 3,747,713.

BACKGROUND OF THE INVENTION

1. Field of the Invention

The invention relates to brake bands for automatic transmissions. Such a band is fabricated of a flexible and resilient metal strap with friction material bonded thereto and is disposed in the narrow gap between the transmission housing and ring gear drum. Should a brake band break or have slippage problems, a replacement band must ordinarily be installed by first removing and disassembling the transmission, a very costly procedure. This is because the narrow gap between the transmission housing and drum, especially in smaller types of transmissions, necessitates insertion of the new band in an axial direction.

2. Description of the Prior Art

Patents showing brake band end connections for the same general purpose include Somerville U.S. Pat. No. 1,528,957, dated Mar. 10, 1925; Hoffman No. Re. 16,028, dated Mar. 24, 1925 and Cole U.S. Pat. No. 1,562,687, dated Nov. 24, 1925. These prior constructions, however, have various drawbacks in terms of cost of manufacture and operability, which it is an object of the present invention to overcome.

Other prior patents discovered in a search which are generally pertinent but do not teach the present invention are the following:

Edell U.S. Pat. No. 1,395,670 Nov. 1, 1921 Smith U.S. Pat. No. 1,500,341 July 8, 1924 Smith U.S. Pat. No. 1,520,154 Dec. 23, 1924 Hoffman U.S. Pat. No. 1,787,376 Dec. 30, 1930 Reed et al. U.S. Pat. No. 2,692,663 Oct. 26, 1954 Lang U.S. Pat. No. 3,367,466 Feb. 6, 1968 Schell U.S. Pat. No. 3,542,181 Nov. 24, 1970.

In addition, I have developed another construction and method of manufacturing a brake band end connection shown in my co-pending application U.S. Pat. No. 3,747,713, issued July 24, 1973. However, this prior invention is unsuitable for use with certain smaller types of automatic transmissions, because the narrower gap between the drum and housing will not permit longitudinal insertion.

I am also aware of U.S. Pat. No. 3,732,954, issued May 15, 1973 to Robert H. Heid on an application filed on Sept. 2, 1971, but the disclosure in that patent is not believed to affect the patentability of the subjoined claims.

BRIEF SUMMARY OF THE INVENTION

It is an object of the invention to provide a novel and improved brake band end connection especially adapted for smaller transmissions, which enables the band to be replaced without the necessity of removing and dismantling the transmission.

It is also an object of the present invention to provide a brake band end connection which exerts a non-eccentric force on the brake band regardless of an offset condition between the piston rod and the brake band centerline.

According to the invention, the end connection comprises a curved end plate welded to the strap and having a reversely bent pocket at its outer end, the inner end having a transverse edge. The radial dimensions of the pocket are sufficiently small to permit it to be slipped into the space between the drum and housing, even with the aforesaid small transmission. The invention also contemplates a bracket of curved shape having a nose at one end insertable into the pocket and a reversely bent inner end engageable with the inner edge of the end plate. Thus, after the band has been slipped slightly past its final position the bracket can be placed on the end plate, and the assembly then backed up until an upwardly sloping tang on the bracket engages the piston rod and the reversely bent bracket end occupies the space between the drum and housing. The dimensions are such that when load is applied to the bracket it will be distributed substantially equally between the pocket and the inner edge of the end plate.

In a modified form of the invention suitable for certain applications, the dimensions of the parts are such that the reversely bent end of the bracket is spaced from the facing edge of the end plate so that the entire load passes through the bracket tang, the reversely bent end still serving to occupy the space between the band strap and housing.

BRIEF DESCRIPTION OF THE DRAWINGS

FIG. 3 is a fragmentary plan view showing the shape of the bracket and the manner in which it engages the end plate;

FIG. 4 is a side elevational view of the bracket; and

FIG. 5 is a fragmentary elevational view showing a portion of a modified form of the invention in which the reversely bent end of the bracket does not engage the inner edge of the end plate.

DESCRIPTION OF THE PREFERRED EMBODIMENT

Figure 1:
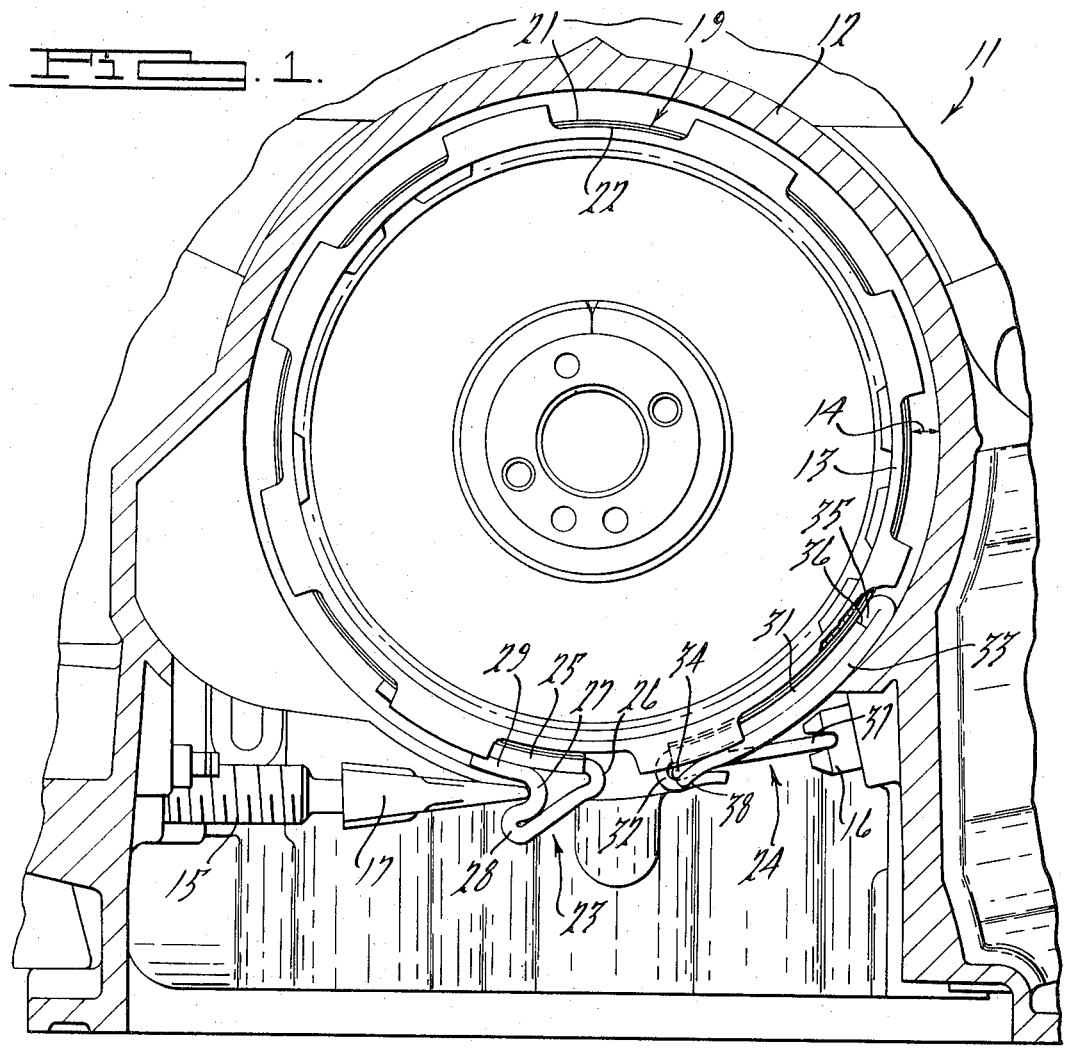
FIG. 1 is a fragmentary cross-sectional view in elevation of a transmission housing showing the drum and a brake band constructed in accordance with the principles of this invention.

An automatic transmission is generally indicated at 11 in FIG. 1 and has a circular housing 12 surrounding a brake drum 13 for the ring gear of a planetary system. The radial gap between the drum and housing is indicated by the double-ended arrow 14 in FIG. 1. The housing carries an adjustable backup screw 15 and a piston rod 16 on opposite sides thereof, the backup screw having a strut 17 for engagement with a brake band and the piston rod having a notch 18.

The brake band is generally indicated at 19 and comprises a flexible resilient metal strap 21 and a friction lining 22 bonded thereto. Band 19 is provided with first and second end connections generally indicated at 23 and 24 respectively. End connection 23 comprises a curved end plate 25 secured, for example by spot welding, to strap 21. The end plate has a first or outer reverse fold 26 and a second fold 27, a sharply bent portion 28 forming the juncture between these two folds. An extension 29 from fold 27 is spot-welded in overlapping relation with plate 25. Fold 27 thus serves as a seat or pocket for strut 17 whereas fold 26 reinforces this strut seat. It will be observed that the radial dimensions of end plate 25 and its connected parts is substantially greater than gap 14.

End connection 24 is constructed in accordance with the invention and comprises a curved end plate 31 welded to strap 21 and having a reversely bent tapered pocket 32 at its outer end. A curved brakcet 33 overlaps end plate 31 and has a nose portion 34 which enters pocket 32. The other end of bracket 33 is reversely bent as indicated at 35 with the reverse bend abutting the transverse rearward edge 36 of end plate 31. An upwardly bent tang 37 is formed on bracket 33 and is receivable by slot 18 of piston rod 16. For applications where the centerline of piston rod 16 is offset from the center line of band 19, as shown in FIG. 3, the position of tang 37 is offset from the centerline of bracket 33 so as to obtain full engagement between the piston rod and tang. The corners 38 of bracket 33 adjacent nose 34 are bent upwardly so that the bracket will be laterally retained, as described below.

The replacement procedure utilizing a band 19 would be as follows: The oil would first be drained from the transmission housing and the pan and valve body removed. All broken pieces of the old band would then be removed. When replacing a slipping band that is not broken, one band end may be pulled downwardly and cut off with tin snips. Replacement band 19 will then be inserted in gap 14 with nose 32 being fed first. For clearance purposes, a chamfer or radius 39 may be provided on one corner of band 19 adjacent pocket 32 (FIG. 3). In FIG. 1, the feeding of band 19 will be in a clockwise direction.

Figure 2:
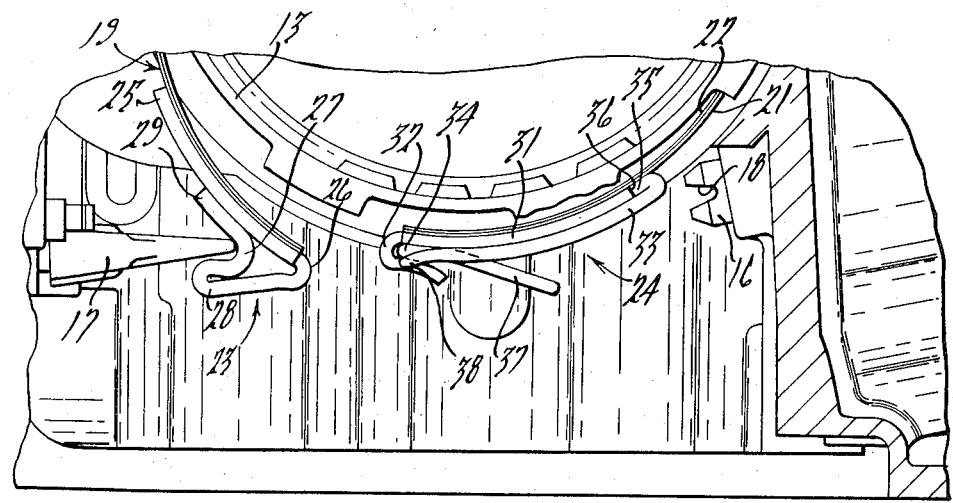
FIG. 2 is a fragmentary view similar to FIG. 1 but showing the brake band being installed.

FIG. 2 shows an intermediate position in the installation procedure. In this Figure, screw 15 has been backed off so that end connection 24 (less bracket 33 at this point) may be fed past piston rod 16 a sufficient distance to enable insertion of bracket 33. It may be necessary to also back off piston rod 16 temporarily to permit bracket 33 to enter into housing 12. Nose 34 of the bracket will be slipped into pocket 32 and the bracket swung down against end plate 31 until reverse bend 35 almost engages and abuts edge 36 of the end plate. The dimensions of the parts are preferably such that at this point in the installation procedure nose 34 will not have fully entered tapered pocket 32 and a slight gap exists between reverse bend 35 and edge 36.

The brake band and bracket may then be slipped back and screw 15 advanced so that the parts go from the FIG. 2 to the FIG. 1 position. During this movement, tang 37 will enter slot 18 of piston rod 16 and bracket 33 fit within housing 12 so that the latter will hold it in place, reverse bend 35 occupying substantially the entire space between strap 21 and housing 12. Meanwhile, outwardly bent tabs 38 will engage the side edges of pocket 32 to prevent lateral displacement of the bracket. The tendency of the brake band to uncoil will hold bracket 33 against housing 12.

With screw 15 properly adjusted and locked, the parts are ready for operation. The force applied by piston rod 16 to tang 37 will cause nose 34 to enter pocket 32 more fully. The construction is such that in a loaded position approximately half of the total load will be transmitted from bracket 33 to end plate 31 through nose 34 and the other half through reverse bend 35.

It should be observed that the offset nature of piston rod 16 (FIG. 3) with respect to the centerline of band 19 will not result in an off-center force being exerted on the brake band. This is because nose 34 will engage pocket 32 along its entire width with the resultant force on the brake band being centered.

FIG. 5 shows another embodiment of the invention which is suitable for certain applications. This construction is the same as that in the previous embodiment with the exception that reverse bend 35' of end connection 24 is relieved sufficiently to avoid contact with inner edge 36 of end connection 31 even when force is applied by piston rod 16 to tang 37. Therefore, even in the loaded position, the entire load will be transmitted from bracket 33 to end plate 31 through nose 34 and pocket 32. However, reverse bend 35' will still serve the purpose of occupying the space between strap 21 and housing 12 so as to maintain the radial positioning of the parts. It will be observed that the modified form of the invention shown in FIG. 5 still permits the band to be replaced without the necessity of removing and dismantling the transmission and achieves the other objects of the invention.

It should be observed that both forms of the invention permit removable attachment of the bracket to the end plate without the need for separate fastening means or other extra parts. The resiliency of pocket 32 will cause the pocket to grip nose 34 after force has been applied in use to further secure the bracket in place by a pinching action so that it cannot become loose. The construction of tang 37 integral with the bracket and connecting it with piston rod 16 will aid in transmitting piston rod forces to the brake band in a manner which holds the band close to the drum at all times. The fact that bracket 33 and its shoulder 34 occupy the space between strap 21 and housing 12 further inhibits any loose band movement. It is believed that this construction prevents the buildup of a substantial oil layer between the brake band and drum which would have to be squeezed out when force is applied by the piston rod, and thus reduces the possibility of slippage and chatter.

I claim:

1. A brake band end connection which enables the band to be fed longitudinally between a transmission housing and a drum and be engaged by an axially reciprocating force-applying member carried by the housing, the end connection comprising a curved end plate overlapping and secured to the brake band, a reversely shaped pocket on the outer end of said end plate, the other end of the end plate having a transverse edge, a separate curved bracket having a nose receivable by said pocket and a shoulder at the other end of sufficient thickness to occupy substantially the entire space between the brake band and housing when the parts are in operative position, and an outwardly extending tang engageable by said force-applying member when the band is moved so as to slide the bracket back into the space between the drum and housing, the thickness of the bracket including said shoulder being such that it will be retained by the housing, said bracket thickness being constant along its length sufficiently so that the bracket can be slid back into the space between the drum and housing, the dimensions of said shoulder being such that when full force is applied by the force-applying member to the tang the shoulder will be spaced from said transverse end plate edge, said tang being axially aligned between said reciprocating force-applying member and said nose, whereby the entire force will be transmitted to the end plate through said nose and pocket.

2. The combination according to claim 1, one corner of said brake band adjacent said end connection being relieved to facilitate entry into the housing.

3. The combination according to claim 1, said bracket being further provided with upwardly extending corners engaging the sides of said pocket to prevent lateral displacement of the bracket.

4. The combination according to claim 1, said outwardly extending tang being laterally offset from the centerline of the bracket, whereby it may be received by a force-applying member offset from the centerline of the brake band.

* * * * *